United States Patent [19]

Dworak

[11] 4,111,872

[45] Sep. 5, 1978

[54] PROCESS FOR PRODUCING WATER-SOLUBLE BINDERS FOR ELECTRODEPOSITION

[76] Inventor: Gert Dworak, Dr.-Robert-Grafstrasse 25/9/59/60, 8010 Graz, Austria

[21] Appl. No.: 561,798

[22] Filed: Mar. 25, 1975

[30] Foreign Application Priority Data

Apr. 3, 1974 [AT] Austria .................................. 2789/74

[51] Int. Cl.$^2$ .............................................. C08L 91/00
[52] U.S. Cl. ........................... 260/23.7 A; 204/181 C; 260/23.7 R; 260/42.44; 260/862; 260/873; 260/876 R
[58] Field of Search ............. 260/23.7 A, 862, 23.7 R, 260/873, 876 R

[56] References Cited

U.S. PATENT DOCUMENTS

| | | | |
|---|---|---|---|
| 3,518,213 | 6/1970 | Miyoshi et al. | 60/862 |
| 3,689,446 | 9/1972 | Furuya et al. | 260/23.7 A |
| 3,705,866 | 12/1972 | Shibata | 260/23.7 A |

*Primary Examiner*—Melvyn I. Marquis
*Attorney, Agent, or Firm*—A. W. Breiner

[57] ABSTRACT

A process for preparing, and water-soluble binders are described characterized in that diene polymers are completely reacted with alpha, beta-ethylenically unsaturated carboxylic acids or derivatives thereof to form an adduct; the carboxyl content of the adduct esterified with a monoalcohol up to a maximum of 70 percent by weight of the carboxyl groups to provide a partially esterified adduct, and 80 to 98 percent by weight of the partially esterified adduct and 2 to 20 percent by weight of a resinous polycarboxylic acid having an acid value of from 150 to 350 mg KOH/g are jointly reacted with an inorganic or organic base to form a water-soluble salt. The water-soluble binders which are particularly suitable for electrodeposition provide coatings having good through-drying characteristics, excellent hardness, good surface appearance, and excellent resistance to corrosion.

19 Claims, No Drawings

PROCESS FOR PRODUCING WATER-SOLUBLE BINDERS FOR ELECTRODEPOSITION

The present invention is directed to water-soluble binders. More particularly, the invention is directed to water-soluble binders based on diene polymers particularly suitable for electrodeposition which have good corrosion resistance, but which do not exhibit unfavorable rapid surface oxidation or surface drying.

Aqueous binders containing diene polymers are gaining importance for the preparation of primers for electrodeposition, primarily because the polymers are not saponifiable and, therefore, are highly resistant to corrosion. Normally, low molecular diene polymers, preferably liquid at ambient temperature, e.g., oligomers of butadiene or pentadiene, are transformed into polycarboxylic acid resins through the addition of unsaturated carboxylic acids like maleic anhydride. These resins are rendered water soluble by neutralization with bases.

The diene polymers conventionally employed for reaction with the unsaturated carboxylic acids have a high content of carbon-carbon double bonds to give an iodine number (Wijs, ASTM D 2078) of up to 480. The polycarboxylic acid resins produced therefrom also have a high degree of unsaturation and, in contact with oxygen from air, tend to undergo rapid oxidation. This leads to the formation of a horn-like structure at the surface of a cured film of the resin, while in many cases the lower zones of the film are insufficiently cured because oxygen diffusion is restricted. Accordingly, polycarboxylic acid resins comprising such diene polymers, to improve through-hardening of the film, are usually extended with other film-forming materials with a lower level of unsaturation.

Suitable extenders are, e.g., carboxyl group containing water-soluble phenolic resins, as disclosed in U.S. Pat. No. 3,658,736. Another suggestion advanced to extend the diene polymers is described in Deutsche Offenlegungsschrift No. 2,016,223. According to this reference, blends of diene polymers with natural oils are reacted with maleic anhydride to form polycarboxylic acid resins. A similar process using other alpha,beta-unsaturated dicarboxylic acids is described in U.S. Pat. No. 3,489,704. When comparing the level of adductable double bonds, expressed in iodine numbers of 350 – 450 for the diene polymer and 120 – 170 for the vegetable oils, it can easily be seen that the alpha,beta-unsaturated carboxylic acid preferably reacts with the higher unsaturated diene polymer and to a lesser extent with the vegetable oil. Accordingly, the acid groups are not distributed uniformly between the two reaction partners, which, in turn, leads to reduced corrosion protection from the coatings produced from such binders.

According to the present invention, improved binders are produced which are water-soluble when at least partially neutralized. The process of preparing the binders is characterized in that (A) 70 – 90 percent by weight of a diene polymer, preferably an alkane diene homopolymer or copolymer with a molecular weight of from 500 – 5,000, and (B) 10 – 30 percent by weight of an alpha,beta-ethylenically unsaturated carboxylic acid and/or dicarboxylic acid and/or semiester and/or anhydride, preferably maleic anhydride, are reacted completely at 150° – 250° C. and a monoalcohol utilized until from 5 percent to a maximum of 70 percent of the carboxyl groups or latent carboxyl groups are esterified with the monoalcohol.

Thereafter,

80 – 90 percent by weight of the partially esterified adduct obtained above, and 2 – 20 percent by weight of a resin-like polycarboxylic acid with an acid number of from 150 – 350 mg KOH/g are jointly reacted with an inorganic or organic base to form a water-soluble salt.

The process of the invention permits shorter and simpler production procedures, since the resin-like polycarboxylic acid need not be transformed to a resin-like polyhydroxyl polycarboxylic acid through further esterification with excess alcohol. Surprisingly, the quantity of resin-like polycarboxylic acid in the diene polymer adduct can be kept lower than when using polyhydroxyl polycarboxylic acids in order to obtain an equal degree of through-hardening. This entrains a higher level of unsaponifiable diene polymer in the total binder which further improves the corrosion resistance of such coatings.

The components for the binders of the invention are produced according to the following methods:

The partially esterified adduct is produced in known manner by reacting diene polymers with alpha,beta-unsaturated carboxylic acid and/or dicarboxylic acid and/or anhydride and/or semiester thereof and the subsequent reaction of the adduct with a monoalcohol.

Diene polymers as used herein are low molecular weight polymers, or at room temperature preferably liquid oligomers, of the conjugated diolefines such as butadiene-1,3; 2-methylbutadiene-1,3; 2,3-dimethylbutadiene-1,3; cyclopentadiene or their halogenated derivatives, or optionally copolymers of the diolefin monomers with styrene, alpha-methylstyrene, vinyltoluol, vinylacetate, (meth)acrylates, or (meth)acrylnitrile. These oligomers have molecular weights of between 500 and 20,000, a viscosity of between 3 and 20 Poise at 20° C. and mainly carry isolated double bonds which can optionally be partially hydrated. The iodine number (Wijs) ranges between 200 and 480. The diene polymers can also be subjected to a subsequent graft polymerization with styrol, vinyltoluol, alpha-methylstyrol, (meth)acrylates, acrylnitrile, etc.

Suitable alpha,beta-ethylenically unsaturated carboxylic acids are (meth)acrylic acid, maleic acid, maleic anhydride, maleic semiesters, fumaric acid, or itaconic acid. When using maleic semiesters, they are recyclized to maleic anhydride and an alcohol at the reaction temperatures for the diene polymer.

The reaction between the diene polymer and the preferably used maleic anhydride is carried out at 150° – 250° C. until the anhydride has reacted completely. Then the reaction product is reacted under reflux conditions with a monoalcohol. For accelerating the esterification reaction, catalysts, preferably tertiary amines, can be co-employed. With the aid of the acid value, the reaction is monitored until a maximum of 70 percent of the carboxyl groups or latent carboxyl groups of the diene polymer/carboxylic acid adduct are reacted with the monoalcohol. Although the degree of the esterification of the carboxyl content of the adduct can be from about 5 to 70 percent, preferably from about 20 – 58 percent of the carboxyl content will be esterified with the monoalcohol. Suitable monoalcohols for use herein are methanol, ethanol, n-propanol, isopropanol, n-butanol, isobutanol, sec. butanol and alkanols with longer chains, i.e., up to about 20 carbon atoms, semiethers of ethylene glycol, diethylene glycol or the polyethylene glycols, e.g., ethyleneglycol monomethylether, ethyleneglycol monoethylether, ethyleneglycolmonobutylether, diethyleneglycolmonoethylether, propyleneglycol monobutylether. The critical feature is that they have only one reactive hydroxyl group. The lower alkanols, i.e., $C_1$ - $C_4$, are preferred.

The second component of the binders of the present invention comprise resin-like polycarboxylic acids with an acid number of from 150 to 350 mg KOH/g formed by the reaction of unsaturated fatty acids or natural or synthetic esters thereof, or unsaturated hydrocarbon resins with alpha,beta-unsaturated carboxylic acids and/or dicarboxylic acids and/or anhydrides. Suitable unsaturated fatty acids are tall oil fatty acid, linseed oil fatty acids, soya oil fatty acids, and dehydrated castor oil fatty acids. The preferred esters are the natural oils like linseed oil or soya oil, or dehydrated castor oil. Among the unsaturated hydrocarbon resins copolymers of cyclopentadiene, methylcyclopentadiene and isoprene with a molecular weight average of about 400 and an iodine number of 190 – 250 (ASTM D 555) give very good results. Suitable alpha,beta-ethylenically unsaturated carboxylic acids are (meth)acrylic acid, maleic acid, maleic anhydride, fumaric acid, and itaconic acid. When using maleic acid semiesters they are also recycled to maleic anhydride through the splitting off of an alcohol. Adducts carrying anhydride groups are opened with water and/or monoalcohols. Alcohols suitable for this partial esterification are alkanols with from 1 – 20 C-atoms.

The binders of the invention, which are water-soluble upon neutralization, consist of 98 - 80 percent by weight of the adduct semiester and 2 – 20 percent by weight of the resin-like polycarboxylic acid, calculated as solids. The two components represent a blend. The combination product or blend of both components can be dissolved with solvents for better handling, to preferably provide a solids content of from 60 – 95 percent. Suitable solvents are alkanols, e.g., methanol, ethanol, n-propanol, isopropanol, n-butanol, sec. butanol, tert. butanol, isobutanol, etc., glycol ethers, e.g., ethyleneglycol monomethylether, propyleneglycol monopropylether, diethylene glycol diethyl ether, etc., furthermore, ketones, like methylethyl ketone, methylisobutyl ketone, 4-methoxy-4-methyl-2-pentanone and diacetone alcohol.

In order to disperse the binders of the invention in water, their carboxyl groups must be neutralized to at least 40 percent. Suitable neutralization agents are alkali hydroxides, e.g., potassium hydroxide, but primarily compounds carrying a basic nitrogen atom, e.g., ammonia and aliphatic amines or alkanol amines. Examples are diethylamine, triethyl amine or homologues, diethanol amine, dimethyl ethanol amine, diisopropanol amine, etc.

The at least partially neutralized binders are easily soluble in water or dilutable with water, that is, the binders can be dispersed in water without forming an insoluble top or base layer on storage at room temperature for several days. It is not necessary that the aqueous solutions are completely clear, they can be slightly or fairly opaque. The solids content in the application form can range from 3 – 40 percent.

The binders can be applied to the objects from their clear or pigmented aqueous solutions. Electrodeposition is the preferred application method, the object being coated wired as the anode. The binders can also be applied by brushing, dipping, or spraying. Upon curing at temperatures of up to 200° C., the binders of the invention give films with extraordinary resistance to corrosion. The protection is provided independent of the quality of pretreatment of the surface of the object being coated. This means in industrial practice that the conventional phosphating and chromating process normally used to enhance corrosion resistance can be omitted.

The following examples illustrate the invention without limiting the scope of it. Parts are by weight unless stated otherwise.

Preparation of the Adduct Ester

Partial Component I A 500 g of liquid polybutadiene with a viscosity of 8 Poise at 20° C., an iodine number of about 450 (ASTM D 2078), a microstructure of about 70 percent 1,4-cis, 28 percent 1,4-trans and 2 percent 1,2 vinyl-configuration, and 1.5 g of copper naphthenate with a metal content of 9 percent, and 100 g of maleic anhydride are charged to a three-necked reaction vessel equipped with reflux condensor and inert gas duct. The reaction mixture is heated to 200° C. within 3 hours while stirring and under a blanket of inert gas. After 4 hours of reaction at 200° C., no free maleic anhydride can be traced. Upon cooling to 90° C., 50 g methanol are added within 1 hour while refluxing. The finished partial ester has a solids content of 97 percent and an acid value of about 80 mg KOH/g. The viscosity of a solution of 58 g Partial Component I A in 42 g of ethyleneglycol monoethylether is 160 s, DIN 53 211.

Partial Component I B 400 g of liquid polybutadiene (as used in Partial Component I A), 1.5 g of copper naphthenate with a metal content of 9 percent, and 100 g of maleic anhydride are stirred and heated to 200° C. within 3 hours in a three-necked reaction vessel equipped with reflux condensor and inert gas duct. After 3 hours of reaction time no free maleic anhydride can be traced. The reaction mass is cooled to 90° – 100° C., diluted with 50 g of diacetone alcohol and esterified with a blend of 35 g of methanol and 3 g of triethylamine. The acid value, after reaction, is 95 – 100 mg KOH/g. The resin has a solids content of 90 percent.

Partial Component I C 425 g of liquid polybutadiene as used in Partial Component I A, 75 g of an unsaturated hydrocarbon resin which is a copolymer of cyclopentadiene, methylcyclopentadiene, and isoprene with an average molecular weight of about 400 and an iodine number of 190 - 200 (ASTM D 555), 1.5 g of copper naphthenate with a metal content of 9 percent, and 100 g of maleic anhydride are stirred and heated to 200° C. within 3 hours in a three-necked reaction vessel with reflux condensor and inert gas duct. After 3 hours of reaction, no free maleic anhydride can be traced. The batch is cooled to 90° – 100° C. and esterified with 100 g of ethylene glycolmonoethylether to an acid number of 80 mg KOH/g. The resin has a solids content of 98.5 percent.

Partial Component I D 500 g of liquid polybutadiene with a viscosity of 7 Poise at 25° C., an iodine number of about 400 (Wijs) and a microstructure of about 10 percent 1,4-cis, 45 percent 1,4-trans and 45 percent 1,2-vinyl-configuration, 1.5 g of copper naphthenate with a metal content of 9 percent, and 100 g of maleic anhydride are stirred and heated to 200° C. within 3 hours in a three-necked reaction vessel equipped with reflux condenser and inert gas duct. After 4 hours of reaction time no free maleic anhydride can be traced. After cooling to 90° C., 50 g of methanol are added within 1 hour, while refluxing. The finished Partial Component I D has a solids content of 97 percent and an acid value of about 80 mg KOH/g.

Polycarboxylic Component

Polycarboxylic Component II A 250 g of linseed oil fatty acids and 100 g of maleic anhydride are stirred and heated to 220° C. in a three-necked reaction vessel equipped with inert gas duct and reflux condenser. After 4 hours of reaction time no free maleic anhydride can be traced. The batch is cooled to 100° C., diluted with 40 g of diacetone alcohol and hydrolyzed with 30 g of water. The acid value is then 320 mg KOH/g, the resin solids 86 percent.

Polycarboxylic Component II B 250 g of tall oil fatty acids with 2 percent of rosin acid, and 100 g of maleic anhydride are stirred and heated to 210° C. within 3 hours in a three-necked reaction vessel equipped with reflux condenser and inert gas duct. After 8 hours of reaction, no free maleic anhydride can be traced. At 130° C., 40 g of diacetone alcohol are added. The batch is cooled to 90° C. and a blend of 30 g of water, 5 g of diacetone alcohol and 3 g of triethylamine is added. After hydrolysis, the acid value is 350 mg KOH/g. The finished Polycarboxylic Component II B has a solids content of 86 percent.

Polycarboxylic Component II C 300 g of a liquid hydrocarbon resin which is a copolymer of cyclopentadiene, methylcyclopentadiene, and isoprene, with an average molecular weight of about 400 and an iodine number of 190 - 200 (ASTM D 555), and 100 g of maleic anhydride are stirred and heated to 220° C. within 3 hours in a three-necked reaction vessel equipped with reflux condenser and inert gas duct. After 7 hours of reaction no free maleic anhydride can be traced. The batch is cooled to 140° C. and diluted with 60 g of diacetone alcohol. At 90° - 100° C. the adduct is reacted with 30 g of water. After 2 hours of reaction, the batch is diluted with isopropanol to a solids content of 70 percent. The acid value is 260 mg KOH/g.

Polycarboxylic Component II D 400 g of linseed oil and 100 g of maleic anhydride are stirred and heated to 220° C. within 2 hours in a three-necked reaction vessel equipped with reflux condenser and inert gas duct. After 3 hours of reaction the content of free maleic anhydride has fallen to below 0.05 percent. The batch is cooled to 90° - 100° C. and esterified with 35 g of methanol. The acid value is 100 mg KOH/g, the resin solids being 98 percent.

EXAMPLE 1

595 g of Partial Component I B and 33 g of Polycarboxylic Component II A are mixed at 70° C. and diuted to 70 percent solids with 181 g of isopropanol. The components are present in a solids ratio of 95 : 5. The acid value of the combined resin is 115 mg KOH/g.

286 g of the 70 percent resin blend are passed over a three roll mill together with 32 g of titanium dioxide (Rutile type), 26 g of aluminum silicate pigment, 2 g of carbon black, and 2 g of strontium chromate. The obtained 348 g of pigment paste are neutralized with 0.2 mols of ammonia by stirring and slowly diluted with deionized water to a solids content of 10 percent by weight of binder. The diluted paint solution has a pH-value of 7.05 and a conductivity of 3,600 $\mu S$ cm$^{-1}$ (25° C.). A metal container of 2.5 liter volume, filled with the paint solution, is wired as cathode in a D.C. circuit. A degreased steel panel of 200 cm$^2$ surface wired as the anode is dipped into the paint solution. Upon connection of a direct current at 180 V a dense film is deposited, and subsequently rinsed well with water. With curing at 180° C. for 30 minutes a smooth coating of 20 $\mu m$ is formed. The results of the evaluation of the coating are tabulated at Table I.

EXAMPLE 2

595 g of Partial Component I B and 33 g of Polycarboxylic Component II B are mixed at 70° C. and diluted to 70 percent solids with 181 g of isopropanol. The components are present in a solids ratio of 95 : 5. The resin is further processed and evaluated analogous to Example 1 above.

EXAMPLE 3

A blend of 657 g of Partial Component I A and 83 g of Polycarboxylic Component II B is diluted with isopropanol to 70 percent solids. The components are present in a solids ratio of 90 : 10. The resin is further processed analogous to Example 1. The evaluation results are tabulated at Table I.

EXAMPLE 4

700 g of Partial Component I C and 42.8 g of Polycarboxylc Component II B are mixed well at 70° C. and diluted with 297 g of isopropanol to a solids content of 70 percent. The acid value of the combined resin is 107 mg KOH/g. The efflux time of a solution of 100 g of resin (70 percent) and 20 g of ethyleneglycol monoethylether is about 50 seconds, DIN 53 211. The components are present in a solids ratio of 95 : 5. Further processing is carried out analogous to Example 1. Evaluation results are at Table I.

EXAMPLE 5

595 g of Partial Component I B and 86 g of Polycarboxylic Component II C are mixed well at 70° C. and diluted to 70 percent solids with 165 g of isopropanol. The acid value is 119.5 mg KOH/g. The blending solids ratio of the two resin components is 90 : 10. Further processing is carried out analogous to Example 1. Evaluation results are at Table I.

EXAMPLE 6

595 g of Partial Component I B and 28.8 g of Polycarboxylic Component II D are mixed well at 70° C. and diluted with 186.2 g of isopropanol. The components are present in a solids ratio of 95 : 5. The acid value is 100 mg KOH/g and resin solids are 70 percent. Milling, dilution, and deposition are carried out analogous to Example 1. Evaluation results are at Table I.

EXAMPLE 7

657 g of Partial Component I D and 83 g of Polycarboxylic Component II B are mixed at 70° C. and diluted to 70 percent with isopropanol. The components are present in a solids ratio of 90 : 10. The evaluation results are tabulated in Table I.

EXAMPLE 8

595 g of Partial Component I B and 136 g of Polycarboxylic Component II D are mixed well at 70° C. and diluted to 70 percent solids with isopropanol. The blending ratio of the two components is 80 : 20. The resin is further processed analogous to Example 1. The evaluation results are tabulated at Table I.

Comparison Example

To demonstrate the improved performance of the binder of this invention, a binder according to Example 1 on page 7 of Deutsche Offennlegungsschrift No. 2,016,223 was prepared, pigmented, and diluted with water. In order to compare this resin with the examples of the present invention, the resins are deposited not on phosphated steel panels (Bonder 125), but on degreased steel normally available and not phosphated.

This comparative binder is evaluated and the results tabulated at Table I.

Table I

| Examples | 1 | 2 | 3 | 4 | 5 | 6 | 7 | 8 | Comparison Example |
|---|---|---|---|---|---|---|---|---|---|
| Maximum voltage | 210 | 180 | 210 | 180 | 180 | 180 | 200 | 180 | 250 |
| film thickness (μm) | 22 | 17 | 22 | 19 | 18 | 19 | 20 | 22 | 24 |
| Curing temperature 30 min/° C. | 180 | 180 | 180 | 180 | 180 | 180 | 180 | 180 | 180 |
| Surface | S | S | S | S | S | S | S | S | Slightly structured |
| pendulum hardness Persoz (s) | 195 | 210 | 190 | 260 | 210 | 195 | 200 | 230 | 180 |
| Indentation DIN 53 156 | 8.65 | 7.3 | 6.8 over | 7.9 | 7.2 over | 7.0 over | 6.1 | 6.5 over | 7.8 |
| Salt spray resistance ASTM B 117-61 (hours) on degreased steel | 220 | 240 | 240 | 200 | 240 | 240 | 200 | 240 | 150 |
| Aging resistance+) | good | very good | very good | good | good | very good | good | very good | insufficient |

+)The paint is stirred in an open container for ten days at 40° C.; then the evaluation is repeated and compared with the original results.
S = smooth As is apparent from the data set forth in Table I, the water-soluble aqueous binders of the present invention have excellent hardness and corrosion resistance. Moreover, the surface characteristics of the film are smooth, unlike prior art binders having a high degree of unsaturation content where the surface oxidation is extremely rapid to provide a horny or rough surface. Moreover, the compositions have excellent aging characteristics. As seen from the comparative example, after stirring in an open container for 10 days at 40° C., and the binder applied and re-evaluated, the characteristics of the film are still good.

The present invention is defined generally and specifically hereinbefore. Various modifications can be made to the preferred and illustrative examples without departing from the inventive concept. For example, the diene polymer of the examples can be substituted with another diene polymer, as can the monohydric alcohol and/or the alpha,beta-ethylenically unsaturated carboxylic acid. Further, the polycarboxylic acid component utilized in the blend can be modified. These modifications which will be apparent to one skilled in the art based on the present disclosure are covered by the present invention.

It is claimed:

1. Aqueous binders comprising from about 80 - 98 percent by weight of the reaction product which contains carboxyl groups or latent carboxyl groups of
    (A) from about 70 to 90 percent by weight of a diene polymer having a molecular weight of from about 500 to 5,000, and
    (B) from about 10 to 30 percent by weight of an alpha,beta-ethylenically unsaturated carboxylic acid or derivative thereof, and
   wherein from about 5 to 70 percent of the carboxyl groups or latent carboxyl groups of (A) and (B) are esterified with a monoalcohol; and from about 2 - 20 percent by weight of a resinous polycarboxylic acid having an acid number of from about 150 to 350 mg KOH/g, jointly neutralized to the water-soluble form with a base material.

2. The aqueous binder of claim 1 wherein the diene polymer is a liquid butadiene polymer.

3. The aqueous binder of claim 1 wherein the alpha,beta-ethylenically unsaturated carboxylic acid is maleic anhydride.

4. The aqueous binder of claim 1 wherein the monohydric alcohol has a carbon content of from about 1 to 4 carbon atoms.

5. The aqueous binder of claim 1 wherein from about 20 to 58 percent by weight of the carboxyl content or latent carboxyl content of (A) and (B) are esterified with monoalcohol.

6. The aqueous binder of claim 1 wherein the resinous polycarboxylic acid is an adduct of an alpha,beta-ethylenically unsaturated carboxylic acid and an unsaturated fatty acid.

7. The aqueous binder of claim 1 wherein the resinous polycarboxylic acid is an adduct of an alpha,beta-ethylenically unsaturated carboxylic acid and an unsaturated hydrocarbon resin.

8. The aqueous binder of claim 7 wherein the unsaturated hydrocarbon resin is a polymer of cyclopentadiene, methylcyclopentadiene, or isoprene.

9. The aqueous binder of claim 7 wherein the alpha,beta-ethylenically unsaturated carboxylic acid of said resinous polycarboxylic acid is maleic anhydride.

10. The aqueous binder of claim 6 wherein the alpha,beta-ethylenically unsaturated carboxylic acid of said resinous polycarboxylic acid is maleic anhydride.

11. Process for producing aqueous binders comprising polydiene adducts wherein
(A) from about 70 - 90 percent by weight of a diene polymer having a molecular weight of from about 500 to 5,000, and
(B) from about 10 - 30 percent by weight of an alpha,-beta-ethylenically unsaturated carboxylic acid or derivative thereof, are reacted completely at 150° - 250° C. to form an adduct containing carboxyl or latent carboxyl groups, and from about 5 - 70 percent by weight of the carboxyl groups or latent carboxyl groups thereof are esterified with a monoalcohol to form a partially esterified adduct, and thereafter from about 80 - 98 percent by weight of said partially esterified adduct, and from about 2 - 20 percent by weight of a resinous polycarboxylic acid having an acid number of from about 150 to 350 mg KOH/g are jointly neutralized with a base to provide water solubility.

12. The process of claim 11 wherein the diene polymer is a liquid butadiene polymer.

13. The process of claim 11 wherein said resinous polycarboxylic acid is an adduct of an alpha,beta-ethylenically unsaturated carboxylic acid or a derivative thereof and an unsaturated fatty acid.

14. The process of claim 11 wherein said resinous polycarboxylic acid is an adduct of an alpha,beta-ethylenically unsaturated carboxylic acid and an unsaturated hydrocarbon resin.

15. The process of claim 13 wherein maleic anhydride is the alpha,beta-ethylenically unsaturated carboxylic acid of said resinous polycarboxylic acid.

16. The process according to claim 14 wherein maleic anhydride is the alpha,beta-ethylenically unsaturated carboxylic acid of said resinous polycarboxylic acid.

17. The process according to claim 15 wherein the unsaturated hydrocarbon resin is a polymer of cyclopentadiene, methylcyclopentadiene, or isoprene.

18. The process of claim 11 wherein from about 20 to 58 percent by weight of the carboxyl groups of the partially esterified adduct are esterified with the monoalcohol.

19. The process of claim 11 wherein the monoalcohol has a carbon content of from 1 to 4 carbon atoms.

* * * * *